(12) United States Patent
Asano

(10) Patent No.: US 7,321,853 B2
(45) Date of Patent: Jan. 22, 2008

(54) SPEECH RECOGNITION APPARATUS AND SPEECH RECOGNITION METHOD

(75) Inventor: Yasuharu Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/362,331

(22) Filed: Feb. 24, 2006

(65) Prior Publication Data

US 2006/0143006 A1    Jun. 29, 2006

Related U.S. Application Data

(63) Continuation of application No. 10/451,285, filed as application No. PCT/JP02/10868 on Oct. 21, 2002, now Pat. No. 7,031,917.

(30) Foreign Application Priority Data

Oct. 22, 2001    (JP)    ............ P2001-323012

(51) Int. Cl.
*G10L 15/08*    (2006.01)

(52) U.S. Cl. ............ 704/238; 704/231; 704/243

(58) Field of Classification Search ............ 704/276, 704/231, 238, 246, 250, 243, 247, 252, 270, 704/275, 270.1
See application file for complete search history.

(56) References Cited

U.S. PATENT DOCUMENTS

| | | | |
|---|---|---|---|
| 5,008,941 A | 4/1991 | Sejnoha | |
| 5,307,405 A | 4/1994 | Sih | |
| 5,905,773 A | 5/1999 | Wong | |
| 6,381,572 B1* | 4/2002 | Ishimitsu et al. | ............ 704/246 |
| 2002/0186348 A1 | 12/2002 | Covannon et al. | |
| 2003/0055655 A1* | 3/2003 | Suominen | ............ 704/276 |
| 2004/0236573 A1 | 11/2004 | Sapeluk | |

FOREIGN PATENT DOCUMENTS

| | | | |
|---|---|---|---|
| JP | 63 121097 | 5/1988 | |
| JP | 63 121098 | 5/1988 | |

(Continued)

OTHER PUBLICATIONS

Patent Abstracts of Japan, vol. 013, No. 058 (E-714), Feb. 9, 1989 & JP 63 248218 A (Oki Electric Ind. Co. Ltd.), Oct. 14, 1988.

(Continued)

*Primary Examiner*—Patrick N. Edouard
*Assistant Examiner*—Huyen X Vo
(74) *Attorney, Agent, or Firm*—Frommer Lawrence & Haug LLP; William S. Frommer

(57) ABSTRACT

The present invention relates to a speech recognition apparatus and a speech recognition method for speech recognition with improved accuracy. A distance calculator 47 determines the distance from a microphone 21 to a user uttering. Data indicating the determined distance is supplied to a speech recognition unit 41B. The speech recognition unit 41B has plural sets of acoustic models produced from speech data obtained by capturing speeches uttered at various distances. From those sets of acoustic models, the speech recognition unit 41B selects a set of acoustic models produced from speech data uttered at a distance closest to the distance determined by the distance calculator 47, and the speech recognition unit 41B performs speech recognition using the selected set of acoustic models.

4 Claims, 14 Drawing Sheets

FOREIGN PATENT DOCUMENTS

| | | |
|---|---|---|
| JP | 5-227531 | 9/1993 |
| JP | 6-236196 | 8/1994 |
| JP | 7-13591 | 1/1995 |
| JP | 8-286680 | 11/1996 |

OTHER PUBLICATIONS

Patent Abstracts of Japan, vol. 014, No. 360 (P-1088), Aug. 3, 1990 & JP 02 132499 A (Toshiba Corp), May 21, 1990.

Patent Abstracts of Japan, vol. 1999, No. 13, Nov. 30, 1999 & JP 11 237897 A (Kenwood Corp), Aug. 31, 1999.

* cited by examiner

P

22L
REFERENCE
CAMERA
(CCD CAMERA)

22R
DETECTION
CAMERA
(CCD CAMERA)

REFERENCE CAMERA IMAGE

DETECTION CAMERA IMAGE

FIG. 8A

EPIPOLAR LINE #L2

| SETPOINT | DISTANCE |
|----------|----------|
| $n_{b1}$ | 1 |
| $n_{b2}$ | 2 |
| $n_{b3}$ | 3 |
| $n_{b4}$ | 4 |

SETPOINT-DISTANCE TABLE

FIG. 8B

| PARALLAX | DISTANCE |
|----------|----------|
| $\zeta_1$ | 1 |
| $\zeta_2$ | 2 |
| $\zeta_3$ | 3 |
| $\zeta_4$ | 4 |

PARALLAX-DISTANCE TABLE

SPEECH RECOGNITION APPARATUS AND SPEECH RECOGNITION METHOD

This application is a continuation of U.S. patent application Ser. No. 10/451,285 filed Jun. 19, 2003 now U.S. Pat. No. 7,031,917, which is a 371 of International Application PCT/JP02/10868 filed Oct. 21, 2002, having a claim of priority under 35 U.S.C. 119 to Japanese Application 2001-323012 filed in Japan on Oct. 22, 2001, all of which is incorporated herein by reference.

TECHNICAL FIELD

The present invention relates to a speech recognition apparatus and a speech recognition method, and more particularly, to a speech recognition apparatus and a speech recognition method, for recognizing a speech with improved accuracy by means of using sets of acoustic models corresponding to distances from the speech recognition apparatus to sound sources.

BACKGROUND ART

In recent years, increases in the operation speed of CPUs (Central Processing Unit) and storage capacity of memory have been achieved. This has made possible to realize a large-vocabulary speech recognition system capable of recognizing as many words as a few hundred thousand words by means of a statistical model using a large amount speech data or text data.

In speech recognition systems, including such a large-vocabulary speech recognition system, high speech recognition accuracy can be achieved for a speech uttered at a location close to a microphone to which the speech to be recognized is input.

However, if a speech is uttered at a distant location, the speech recognition accuracy decreases with the distance between the microphone and the location at which the speech is uttered, due to influence of noise or the like.

A first known technique to avoid the above problem is disclosed, for example, in a paper entitled "Speech Recognition in Noisy/Reverberant Environment by means of HHM Decomposition/Composition Using a Microphone Array" (Miki, Nishiura, Nakamura, and Shikano, the transaction of the institute of electronic, information and communication engineers D-II, Vol. J83-DII No. 11, pp. 2206–2214, November 2000) (hereinafter, referred to as reference 1). In this technique, a microphone array is used to improve the signal-to-noise (SN) ratio of a speech uttered at a location distant from a microphone, and speech recognition is performed on the speech with the improved signal-to-noise ration.

A second known technique is disclosed, for example, in a paper entitled "Space Diversity Robust Speech Recognition Taking Into Account Space Acoustic Characteristic" (Shimizu, Kazita, Takeda, and Itakura, the transaction of the institute of electronic, information and communication engineers D-II, Vol. J83-DII No. 11, pp. 2448–2456, November 2000) (hereinafter, referred to as reference 2). In speech recognition using this second technique, a plurality of microphones are disposed at various locations in a room, and impulse responses at locations various distances apart from the respective microphones are convoluted with speech data to be learned, and the resultant speech data is learned to produce HMMs (Hidden Markov Models) taking into account the impulse responses at respective distances. The likelihood is then calculated for each of speeches input to the respective microphones, taking into account the impulse responses at the respective distances.

However, in the first and second techniques described above, microphones have to be placed at limited locations. In some cases, the limitation on the locations of microphones makes it difficult to use those techniques.

In recent years, a toy of an autonomously-behaving robot (for example, in the form of a stuffed toy animal) has been brought into market. This robot is capable of recognize a speech uttered by a user and behaving or outputting a synthesized speech, depending on the result of speech recognition. If a speech recognition apparatus using the first technique is installed on such a robot, the limitation on the locations of a plurality of microphones forming a microphone array makes it difficult to realize a robot with a small size, and the limitation also causes a reduction in freedom in designing the robot.

On the other hand, in the case in which a speech recognition apparatus using the second technique is installed on a robot, it is required to dispose a plurality of microphone in each room in which the robot is used. This is not practical. Besides, in the second techniques, it is required to calculate the likelihood of HMM taking into account impulse responses at respective distances, for speeches input to the plurality of microphones, and thus a great amount of calculation is needed in speech recognition

DISCLOSURE OF THE INVENTION

In view of the above, it is an object of the present invention to provide a technique of improving speech recognition accuracy for a speech uttered by a user at a location distant from a microphone, without causing a significant increase in the amount of calculation in speech recognition.

The present invention provides a first speech recognition apparatus comprising distance calculation means for determining the distance to a sound source of a speech; acquisition means for acquiring a set of acoustic models corresponding to the distance determined by the distance calculation means; and speech recognition means for recognizing the speech on the basis of the set of acoustic models acquired by the acquisition means.

The present invention also provides a first speech recognition method comprising the steps of determining the distance to a sound source of a speech; acquiring a set of acoustic models corresponding to the distance determined in the distance determination step; recognizing the speech on the basis of the set of acoustic models acquired in the acquisition step.

The present invention also provides a first program comprising determining the distance to a sound source of a speech; acquiring a set of acoustic models corresponding to the distance determined in the distance determination step; and recognizing said speech on the basis of the set of acoustic models acquired in the acquisition step.

The present invention also provides a first storage medium having a program stored thereon, wherein the program comprises the steps of determining the distance to a sound source of a speech; acquiring a set of acoustic models corresponding to the distance determined in the distance determination step; and recognizing said speech on the basis of the set of acoustic models acquired in the acquisition step.

The present invention also provides a second speech recognition apparatus comprising distance calculation means for determining the distance to a sound source of a speech; acquisition means for acquiring tap coefficients for realizing an inverse filter having a frequency characteristic corresponding to the distance determined by the distance calculation means; filter means for filtering the speech using the tap coefficients acquired by the acquisition means; and speech recognition means for recognizing the speech filtered by the filter means, on the basis of a particular set of acoustic models.

The present invention also provides a second speech recognition method comprising the steps of determining the distance to a sound source of a speech; acquiring tap coefficients for realizing an inverse filter having a frequency characteristic corresponding to the distance determined in the distance determination step; filtering the speech using the tap coefficients acquired in the acquisition step; and recognizing the speech filtered in the filtering step, on the basis of a particular set of acoustic models.

The present invention also provides a second program comprising the steps of determining the distance to a sound source of a speech; acquiring tap coefficients for realizing an inverse filter having a frequency characteristic corresponding to the distance determined in the distance determination step; filtering the speech using the tap coefficients acquired in the acquisition step; and recognizing the speech filtered in the filtering step, on the basis of a particular set of acoustic models.

The present invention also provides a second storage medium having a program stored thereon, wherein the program comprises the steps of determining the distance to a sound source of a speech; acquiring tap coefficients for realizing an inverse filter having a frequency characteristic corresponding to the distance determined in the distance determination step; filtering the speech using the tap coefficients acquired in the acquisition step; and recognizing the speech filtered in the filtering step, on the basis of a particular set of acoustic models.

In the first speech recognition apparatus, the first speech recognition method, and the first program, according to the present invention, the distance to a source of a speech is determined and a set of acoustic models corresponding to that distance is acquired. Speech recognition is performed using the acquired set of acoustic models.

In the second speech recognition apparatus, the second speech recognition method, and the second program, according to the present invention, the distance to a source of a speech is determined and tap coefficients for realizing an inverse filter having a frequency characteristic corresponding to the distance are acquired. A speech is filtered using the acquired tap coefficients, and the filtered speech is recognized using a particular set of acoustic models.

BRIEF DESCRIPTION OF THE DRAWINGS

FIG. 8A is a diagram showing a set point distance table.

FIG. 8B is a diagram showing a parallax distance table.

BEST MODE FOR CARRYING OUT THE INVENTION

Figure 1:
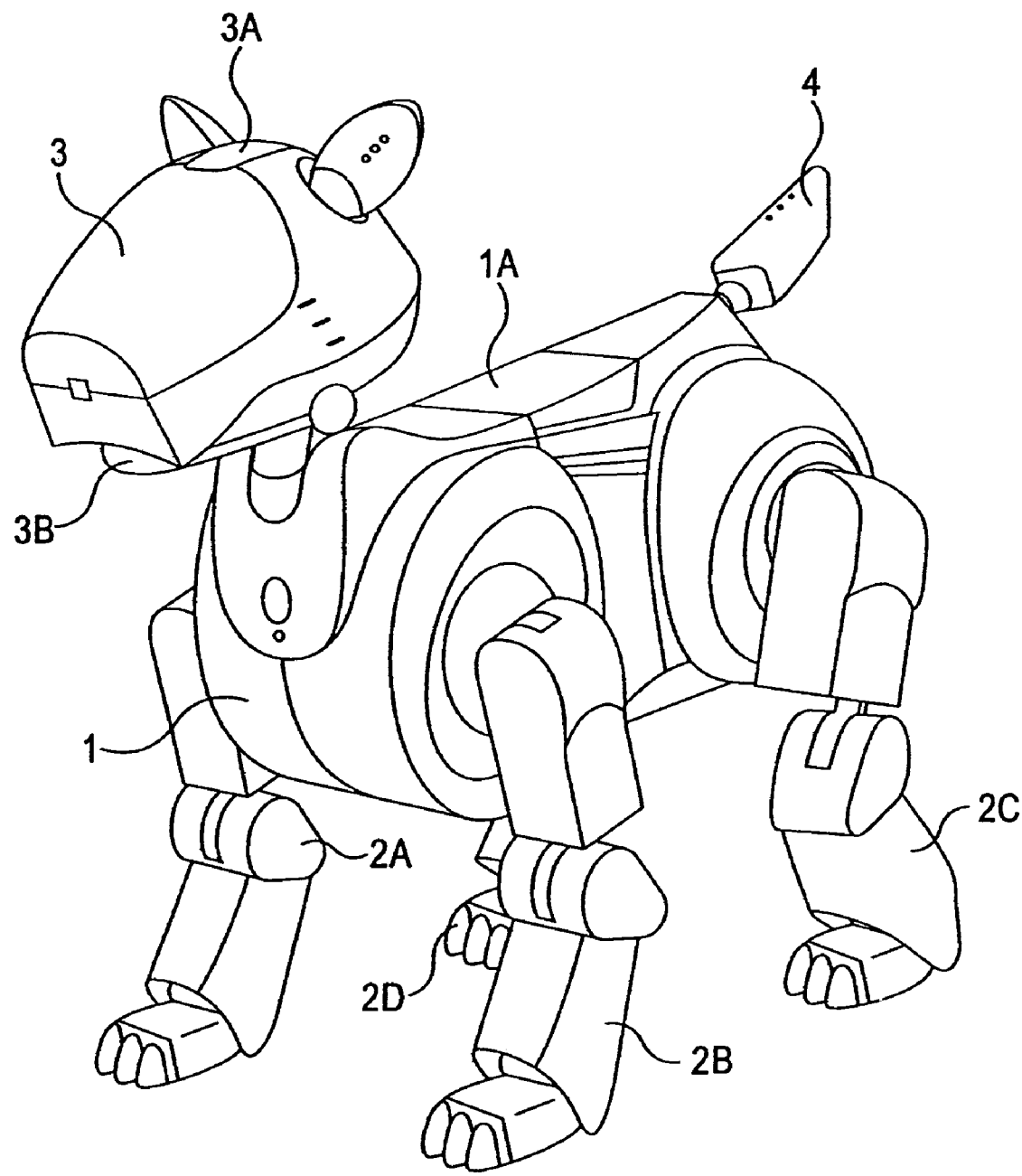
FIG. 1 is a perspective view illustrating the outward appearance of a pet robot according to the present invention.
Figure 2:
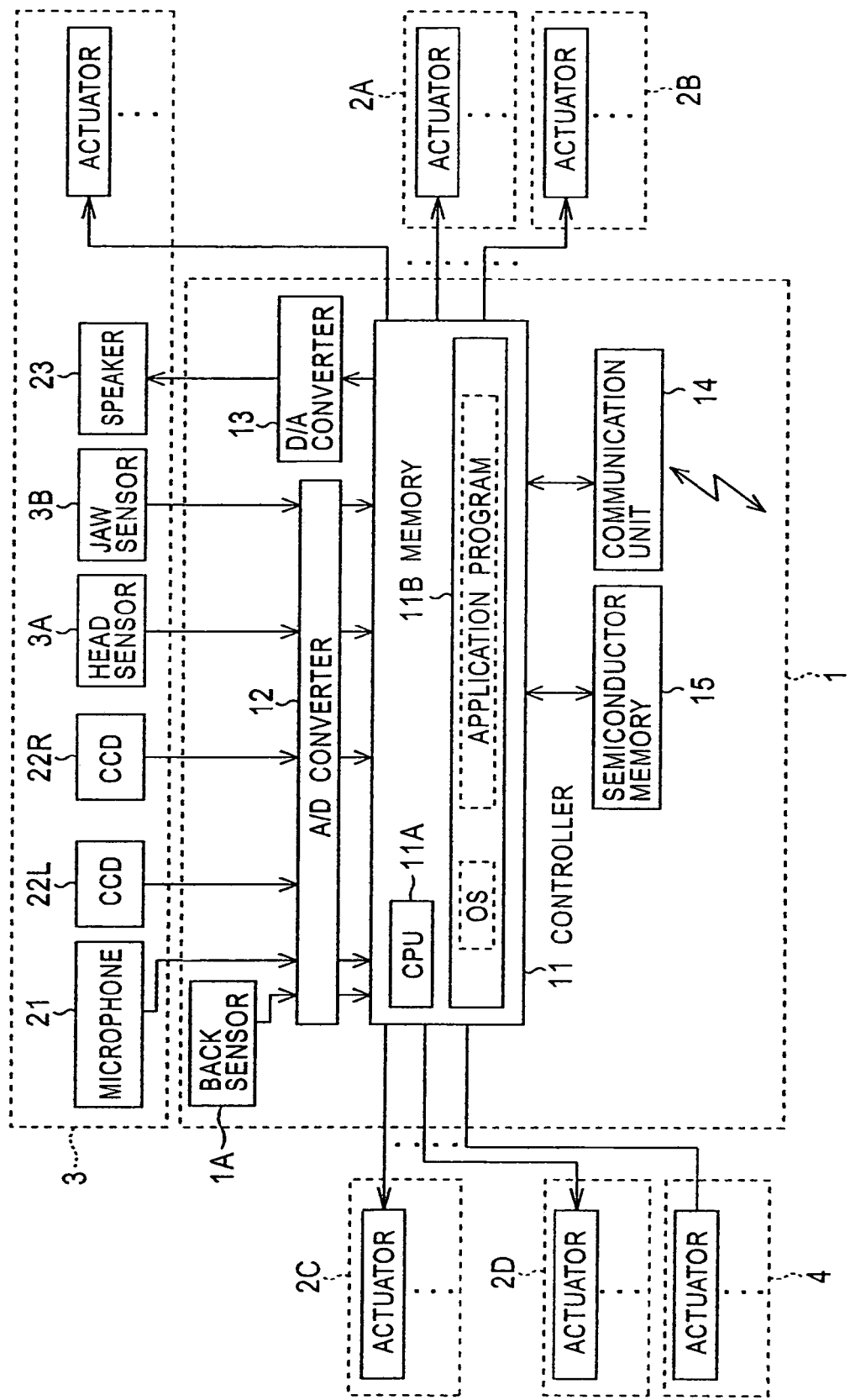
FIG. 2 is a block diagram illustrating an example of the hardware configuration of the pet robot.

FIG. 1 is a perspective view illustrating the outward appearance of a pet robot according to the present invention, and FIG. 2 is a block diagram showing an example of an internal structure thereof.

In the present embodiment, the pet robot is constructed in the form of an animal having four legs, wherein the pet robot is mainly composed of a body unit 1, leg units 2A, 2B, 2C, and 2D, a head unit 3, and a tail unit 4.

The leg units 2A, 2B, 2C, and 2D are connected to the body unit 2, at respective four corners of the body unit 2 so as to serve as legs. The head unit 3 serving as a head is attached to the front end of the body unit 1, and the tail unit 4 serving as a tail is attached to the back end of the body unit 1.

A back sensor 1A is disposed on the upper surface of the body unit 1. A head sensor 3A is disposed on an upper part of the head unit 3, and a jaw sensor 3B is disposed on a lower part on the head unit 3. The back sensor 1A, the head sensor 3A, and the jaw sensor 3B are each formed of a pressure sensor, to detect pressures applied to the respective portions.

The tail unit 4 is connected to the body unit 1 such that the tail unit 4 can freely move in horizontal and vertical directions.

As shown in FIG. 2, the body unit 1 includes, in the inside thereof, a controller 11 an analog to digital converter 12, a digital to analog converter 13, a communication unit 14, a semiconductor memory 15, and the back sensor 1A.

The controller 11 includes a CPU 11A responsible for controlling the entire controller 11 and also includes a memory 11B in which an operating system (OS) executed by the CPU 11A in controlling various units, an application program, and other necessary data are stored.

The analog-to-digital (A/D) converter 12 converts analog signals received from a microphone 21, CCD cameras 22L and 22R, the back sensor 1A, the head sensor 3A, and the jaw sensor 3B into digital signals, which are supplied to the controller 11. The digital-to-analog (D/A) converter 13 converts the digital signal received from the controller 11 into an analog signal and supplies the resultant analog signal to a speaker 23.

The communication unit 14 controls wired or wireless communication with an external apparatus. When an upgraded version of the OS or the application program becomes available, the upgraded version of the OS or the application program can be downloaded into the memory 11B via the communication unit 14. The communication unit 14 is also used to receive a command and transfer it to the CPU 11A.

The semiconductor memory 15 is formed of, for example, EEPROM (Electrically Erasable Programmable Read-On Memory) and is removably inserted into a slot (not shown) in the body unit 1. The semiconductor memory 15 is used to store an emotion model or the like which will be described later.

The back sensor 1A is disposed on an upper part, serving as the back of the pet robot, of the body unit 1 so that a pressure applied by a user to the back of the pet robot is detected by the back sensor 1A and a pressure signal indicating the detected pressure is supplied to the controller 11 via the analog-to-digital converter 12.

The body unit 1 further includes, in the inside thereof, a battery (not shown) serving as a power source of the pet robot and a circuit for detecting the remaining capacity of the battery.

On the head unit 3, as shown in FIG. 2, sensors for detecting stimuli applied from the outside are disposed at properly selected positions. They include the microphone 21 serving as an "ear" for detecting a sound, CCD (Charge Coupled Device) cameras 22L and 22R serving as a "left eye" and a "right eye" for detecting light, and the head sensor 3A and the jaw sensor 3B serving as touch sensors for detecting pressures applied by a user. On the head unit 3, a speaker 23 serving as a "mouth" of the pet robot is disposed at a properly selected position.

Actuators are disposed in joints of the respective leg units 2A to 2D, joints for joining the leg units 2A to 2D with the body unit 1, a joint for joining the head unit 3 with the body unit 1, and a joint for joining the tail unit 4 with the body unit 1. The actuators drive the corresponding joints under the control of the controller 11. For example, when the robot walks, the leg units 2A to 2D are moved by the actuators.

The microphone 21 disposed on the head unit 3 collects a speech (sound) including an utterance of a user from the environment and outputs the obtained speech signal to the controller 11 via the analog-to-digital converter 12. The CCD cameras 22L and 22R take an image of the environment and outputs a resultant image signal to the controller 11 via the analog-to-digital converter 12. The head sensor 3A disposed on the upper portion of the head unit 3 and the jaw sensor 3B disposed on the lower portion of the head unit 3 detect a pressure applied by the user as a physical action such as "rubbing" or "tapping" and output a pressure signal indicating the detected pressure to the controller 11 via the analog-to-digital converter 12.

The controller 11 detects the state of the environment, a command issued by a user, and an action applied to the pet robot by the user on the basis of the speech signal, the image signal, and the pressure signal received via the analog-to-digital converter 12 from the microphone 21, the CCD cameras 22L and 22R, the back sensor 1A, the head sensor 3A, and the jaw sensor 3B. Depending on the detection, the controller 11 determines an action to be taken by the pet robot. In accordance with the decision, the controller 11 drives necessary actuators so as to nod or shake the head unit 3, move the tail unit 4, or make the pet robot walk by moving the leg units 2A to 2D.

Furthermore, as required, the controller 11 synthesizes a sound and supplies a resultant sound signal to the speaker 23 via the digital-to-analog converter 13 thereby outputting the sound from the speaker 23. The controller 11 also turns on/off or blinks LEDs (Light Emitting Diode, not shown in the figures) disposed at locations corresponding to the "eyes" of the pet robot.

As described above, the pet robot autonomously acts in response to the environmental conditions or actions of a user.

Figure 3:
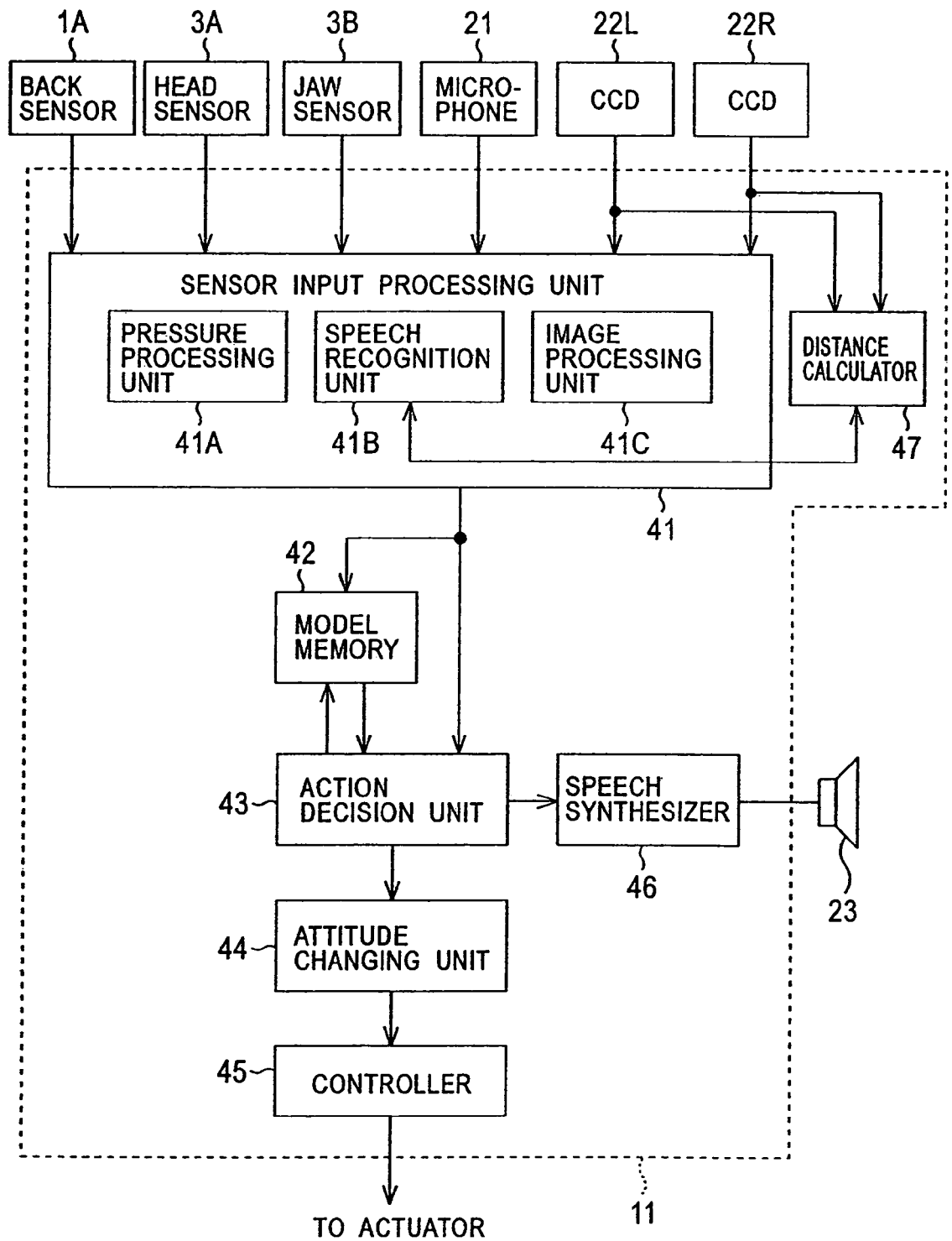
FIG. 3 is a block diagram showing an example of a functional structure of a controller 11.

FIG. 3 shows an example of the functional structure of the controller 11 shown in FIG. 2. The functional structure shown in FIG. 3 can be realized by executing, using the CPU 11A, the OS and the application program stored in the memory 11B. Note that the analog-to-digital converter 12 and the digital-to-analog converter 13 are not shown in FIG. 3.

A sensor input processing unit 41 in the controller 11 detects specific external conditions, an action of a user applied to the pet robot, and a command given by the user, on the basis of the pressure signal, the speech signal, and the image signal supplied from the back sensor 1A, the head sensor 3A, the jaw sensor 3B, the microphone 21, and the CCD cameras 22L and 22R. State information indicating the detected conditions is supplied to a model memory 42 and an action decision unit 43.

For the above purpose, the sensor input processing unit 41 includes a pressure processing unit 41A, a speech recognition unit 41B, and an image processing unit 41C.

The pressure processing unit 41A processes pressure signals received from the back sensor 1A, the head sensor 3A, and the jaw sensor 3B. If the pressure processing unit 41A receives a pressure higher than a predetermined threshold for a short duration, the sensor input processing unit 41A recognizes that the pet robot has been "tapped (scolded)". On the other hand, if the detected pressure has a magnitude lower than a threshold value and continues for a long period of time, the sensed signal processing unit 41A recognizes that the pet robot is "stroked (praised)". Information indicating the result of recognition is supplied as state information to the model memory 42 and the action decision unit 43.

The speech recognition unit 41B recognizes a speech signal received via the microphone 21. For example, if a given speech signal is recognized by the speech recognition unit 41B as a command such as walk", "lie down", or "follow the ball", information indicating the recognized command is supplied as state information to the model memory 42 and the action decision unit 43. The speech recognition by the speech recognition unit 41B is performed taking into account the distance from the microphone 21 to the source of a speech such as that uttered by a user, wherein the distance is determined by a distance calculator 47 which will be described later.

The image processing unit 41C performs image recognition on the basis of the image signals supplied from the CCD cameras 22L and 22R. For example, if the image processing unit 41C detects something red and round" or a "plane extending vertical from the ground to a height greater than a predetermined value", then the image processing unit 41C determines that "there is a ball" or there is a wall". Information indicating the result of image recognition is supplied as state information to the model memory 42 and the action decision unit 43.

The model memory 42 stores and manages an emotion model, an instinct model, and a growth model representing the states of the robot concerning emotion, instinct, and growth, respectively.

The emotion model represents the state (degree) of emotion concerning, for example, "happiness", "sadness", "angriness", and "pleasure" using values within predetermined ranges (for example, from −1.0 to 1.0) wherein the values are varied depending on the state information supplied from the sensor input processing unit 41 and also depending on the passage of time.

The instinct model represents the state (degree) of instinct concerning, for example, "appetite", "desire for sleep", and "desire for exercise" using values within predetermined ranges, wherein the values are varied depending on the state information supplied from the sensor input processing unit 41 and also depending on the passage of time.

The growth model represents the state (degree) of growth, such as "childhood", "youth", "middle age" and "old age" using values within predetermined ranges, wherein the values are varied depending on the state information supplied from the sensor input processing unit 41 and also depending on the passage of time.

Information indicating the states of emotion, instinct, and growth, represented by values of the emotion model, the instinct model, and the growth model, respectively, are supplied as state information from the model memory 42 to the action decision unit 43.

In addition to the stat information supplied from the sensor input processing unit 41, the model memory 42 also receives, from the action decision unit 43, action information indicating a current or past action of the pet robot, such as "walked for a long time", Depending on the pet robot's action indicated by the action information, the model memory 42 varies the state information produced by the model memory 52 even for the same state information supplied to the model memory 42.

More specifically, when the pet robot greets the user, if the user rubs the head of the pet robot, then action information indicating that the pet robot greeted the user and state information indicating that the head was rubbed are supplied to the model memory 42. In this case, the model memory 42 increases the value of the emotion model indicating the degree of happiness.

The action decision unit 43 decides an action to be taken next on the basis of the state information supplied, from the sensor input processing unit 41, the state information supplied from the model memory 42, and the passage of times. Information indicating the decided action is supplied as action command information to an attitude changing unit 44.

More specifically, the action decision unit 43 manages a finite automaton, which can take states corresponding to the possible actions of the pet robot, as an action model which determines the action of the pet robot. The action decision unit 43 switches the state of the finite automaton implementing the action model in accordance with the state information supplied from the sensor input processing unit 41, the values of the model memory 42 associated with the emotion model, the instinct model, the growth model, and/or the passage of time, and the action decision unit 52 employs the action corresponding to the changed state as the action to be taken next.

In the above process, when the action decision unit 43 detects a particular trigger, the action decision unit 43 changes the state. More specifically, the action decision unit 43 changes the state, for example, when the period of time in which the action corresponding to the current state has been performed has reached a predetermined value, or when specific state information has been received, or when the value of the state of the emotion, instinct, or growth indicated by the state information supplied from the model memory 42 becomes lower or higher than a predetermined threshold.

Because, as described above, the action decision unit 43 changes the state of the action model not only depending on the state information supplied from the sensor input processing unit 41 but also depending on the values of the emotion model, the instinct model, and the growth model of the model memory 42, the state to which the current state is changed can be different depending on the values (state information) of the emotion model, the instinct model, and the growth model even when the same state information is input.

More specifically, when the state information indicates that the robot is not "angry" and not "hungry", if the state information indicates that "a user's hand with its palm facing up is held in front of the face of the robot", the action decision unit 42 produces, in response to the hand being held in front of the face of the robot, action command information indicating that shaking should be performed and transmits it to the attitude changing unit 44.

On the other hand, the state information indicates that the robot is not "angry" but "hungry", if the state information indicates that "a user's hand with its palm facing up is held in front of the face of the robot", the action decision unit 43 produces, in response to the hand being held in front of the face of the robot, action command information indicating that the robot should lick the palm of the hand and transmits it to the attitude changing unit 44.

Furthermore, on the basis of the states of emotion, instinct, and growth indicated by state information supplied from the model memory 42, the action decision unit 43 may determine action parameters associated with, for example, the walking pace or the magnitude and speed of moving forelegs and hind legs which should be employed in a state to which the current state is to be changed. In this case, action command information including the action parameters is supplied to the attitude changing unit 44.

In addition to the above-described action command information associated with motions of various parts of the pet robot such as the head, forelegs, hind legs, etc., the action decision unit 43 also produces action command information for causing the pet robot to utter. The action command information for causing the pet robot to utter > is supplied to the speech synthesizer 46. If the speech synthesizer 46 receives the action command information, the speech synthesizer 46 synthesizes a speech in accordance with the received action command information and outputs the synthesized speech from the speaker 23.

In accordance with the action command information supplied from the action decision unit 43, the attitude changing unit 44 produces attitude change command information for changing the attitude of the pet robot from the current attitude to a next attitude and transmits it to the mechanics controller 45.

Possible attitudes to which the attitude of the robot can be changed from the current attitude depend on the shapes and weights of various parts of the pet robot such as the body, forelegs, and hind legs and also depend on the physical state of the pet robot such as coupling states between various parts. Furthermore, the possible attitudes also depend on the states of the actuators such as the directions and angles of the joints.

Although direct transition to the next attitude is possible in some cases, direct transition is impossible depending on the next attitude. For example, the pet robot having four legs can change the attitude from a state in which the robot lies sideways with its legs fully stretched directly into a lying-down state but cannot directly into a standing-up state. In order to change the attitude into the standing-up state, it is necessary to perform a two-step operation-including changing the attitude into the lying-down attitude by drawing in the legs and then standing up. Some attitudes are not easy to change thereinto. For example, if the pet robot having four legs tries to raise its two forelegs upward from an attitude in which the robot stands with its four legs, the robot will easily fall down.

To avoid the above problem, the attitude changing unit 44 registers, in advance, attitudes which can be achieved by means of direct transition. If the action command information supplied from the action decision unit 43 designates an attitude which can be achieved by means of direct transition, the attitude changing unit 44 directly transfers the action command information to the mechanics controller 45.

However, in a case in which the action command information designates an attitude which cannot be achieved by direct transition, the attitude changing unit 44 produces attitude change information indicating that the attitude should be first changed into a possible intermediate attitude and then into a final attitude, and the attitude changing unit 44 transmits the produced attitude change information to the mechanics controller 45. This prevents the robot from trying to change its attitude into an impossible attitude or from falling dawn.

In accordance with the attitude change information received from the attitude changing unit 44, the mechanics controller 45 produces control signals for driving the actuators and transmits them to the actuators.

If the speech synthesizer 46 receives the action command information from the action decision unit 43, the speech synthesizer 46 performs, for example, regular speech synthesis and outputs the resultant synthesized speech from the speaker 23.

The distance calculator 47 receives the image signals from the CCD cameras 22L and 22R. On the basis of the image signals received from the CCD cameras 22L and 22R, the distance calculator 47 performs stereoscopic processing (processing on the basis of stereoscopic matching) to determine the distance from the microphone 21 to a sound source, such as a user uttering a speech, included in the images taken by the CCD cameras 22L and 22R. Data indicating the calculated distance is supplied to the speech recognition unit 41B.

In the stereoscopic processing performed by the distance calculator 47, a plurality of images of the same object are taken by cameras from two or more directions (corresponding to lines of sight), and the parallax is determined from corresponding pixels in the plurality of images. On the basis of the parallax, the distance between the cameras and the object is determined.

Figure 4:
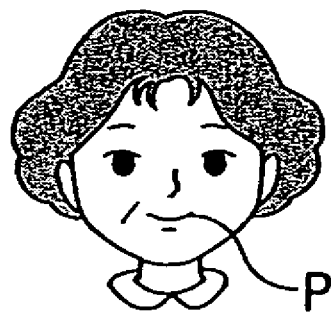
FIG. 4 is a diagram showing a manner in which an image of a user is taken by a reference camera 22L and a detection camera 22R.
Figure 4:
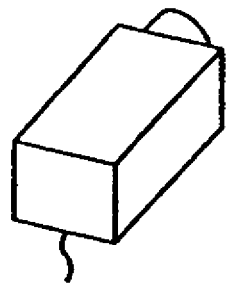
Figure 4:
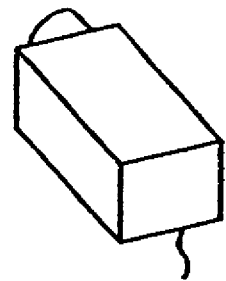

Herein, let the CCD cameras 22L and 22R be referred to as a reference cameral 22L and a detection camera 22R, respectively, and let the images output thereby be referred to as a reference camera image and a detection camera image, respectively. For example, as shown in FIG. 4, if images of an object (a user in this specific example) are taken by the reference camera 22L and the detection cameral 22R, a reference cameral image including an image of the user is produced by the reference camera 22L, and a detection cameral image including an image of the user is produced by the detection camera 22R. In a case in which a certain point on the mouth of the user is included in both the reference camera image and the detection cameral image, parallax information can be determined from the position of point P on the reference camera image and the position of point P on the detection camera image (that is, a corresponding point (corresponding pixel)). The position of point P in the three-dimensional space (three-dimensional position) can be determined from the parallax information by means of triangulation.

In the first step of the stereoscopic processing, as described above, corresponding points are detected. One of known techniques of detecting corresponding points is an area base matching method using an epipolar line.

Figure 5:
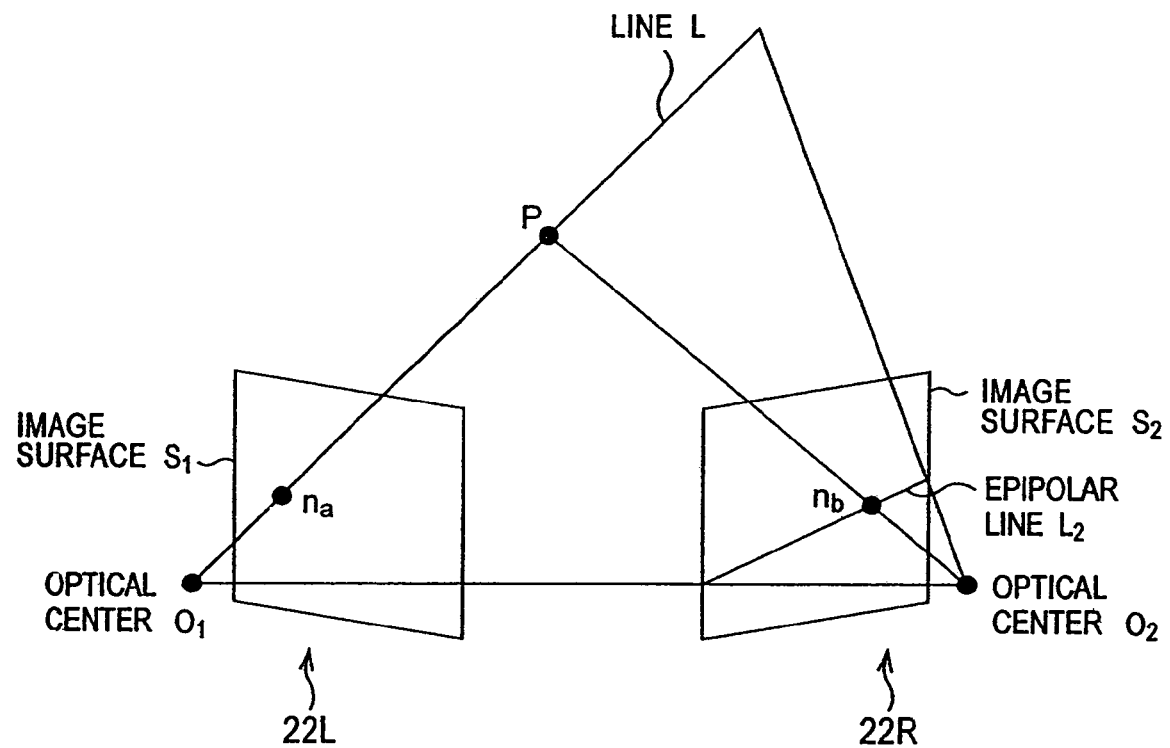
FIG. 5 is a diagram illustrating an epipolar line.

In this method, as shown in FIG. 5, in the image taken by the reference camera 22L, the point P on the user is projected onto an intersection point $n_a$ between the image surface $S_1$ of the reference camera 1 and a line L extending through the point P and the optical center (lens center) $O_1$ of the reference cameral 22L.

Similarly, in the image taken by the detection camera 22R, the point P on the user is projected onto an intersection point $n_b$ between the image surface $S_2$ of the detection camera 22R and a line extending through the point P and the optical center (lens center) $O_2$ of the detection cameral 22R.

In this case, the line L is projected as a line $L_2$ onto the image surface $S_2$ wherein the line $L_2$ is given by an intersection line between the image surface $S_2$ on which the detection camera image is formed and a surface determined by the optical centers $O_1$ and $O_2$ and point $n_2$ (or point P). Because point P lies on the line L, point P is projected on point $n_b$ in the image surface $S_2$ such that point $n_b$ lies on line $L_2$ on which line L is projected wherein line $L_2$ is called an epipolar line. Therefore, point $n_b$ corresponding to point $n_a$ must lie on the epipolar line $L_2$. Thus, the corresponding point $n_b$ can be found on the epipolar line $L_2$.

The epipolar line can exist for each pixel of the reference camera image formed on the image surface $S_1$. If the relative positions of the reference cameral 22L and the detection camera 22R are known, epipolar lines for respective pixels can be determined by means of calculation.

The corresponding point $n_b$ on the epipolar line $L_2$ can be determined, for example, by means of area base matching as described below.

Figure 6A:
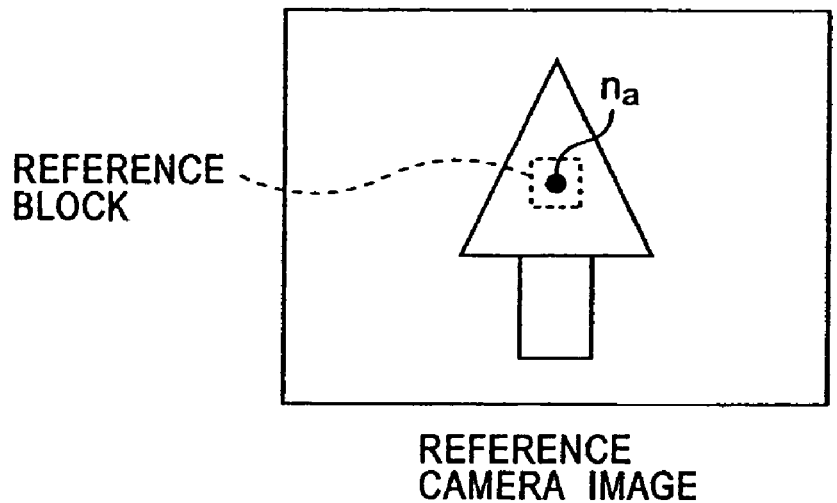
FIG. 6A is a diagram showing a reference camera image.

In the area base matching, as shown in FIG. 6A, a rectangular small block (hereinafter, referred to as a reference block) centered at a point $n_a$ in the reference camera image (for example, an intersection point of diagonal lines of the reference camera image) is extracted from the reference camera image. Furthermore, as shown in FIG. 6B, a small block having the same size as that of the reference block and centered at a certain point on the epipolar line $L_2$ projected onto the detection camera image is extracted from the detection camera image.

Figure 6B:
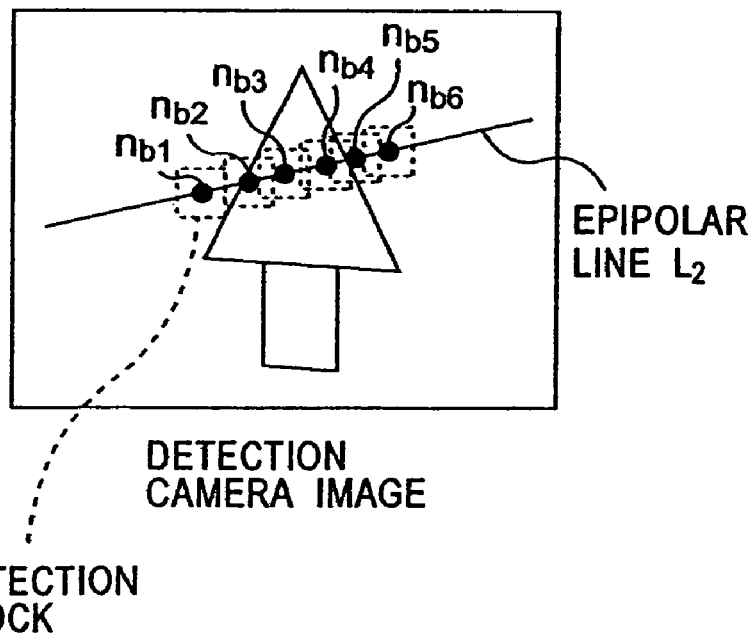
FIG. 6B is a diagram showing a detection camera image.

In the example shown in FIG. 6B, six points $n_{b1}$ to $n_{b6}$ on the epipolar line $L_2$ are selected as center points of detection blocks. Those six points $n_{b1}$ to $n_{b6}$ are obtained by projecting six points on the line L extending in the three-dimensional space shown in FIG. 5 onto the image surface $S_2$ of the detection cameral 22R. More specifically, if six points lying on the line L at distances, 1 m, 2 m, 3 m, 4 m, 5 m, and 6 m, with respect to the reference camera 22L are projected, six points $n_{b1}$ to $n_{b6}$ in the image surface $S_2$ correspond to points on line L at distances 1 m, 2 m, 3 m, 4 m, 5 m, and 6 m, with respect to the reference camera 22L.

In the area base matching, detection blocks centered at points $n_{b1}$ to $n_{b6}$ on the epipolar line $L_2$ are extracted from the detection camera image, and the correlation between each detection block and the reference block is calculated using a particular evaluation function. The center point $n_b$ of a detection block having highest correlation with the reference block centered at point $n_a$ is employed as the point corresponding to point $n_a$.

Figure 7:
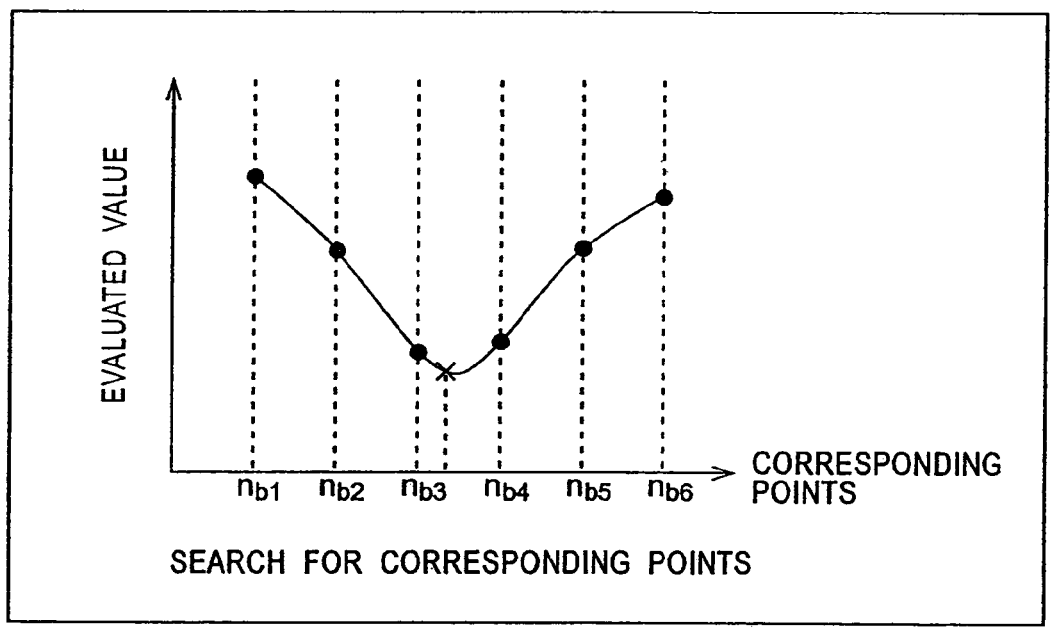
FIG. 7 is a diagram showing evaluation values for various points.

If a function which decreases with correlation is employed as the evaluation function, evaluation values (calculated using the evaluation function) for respective points $n_{b1}$ to $n_{b6}$ on the epipolar line $L_2$ are given, for example, as shown in FIG. 7. In this specific example, point $n_{b3}$ has a smallest evaluation value (highest correlation), and thus point $n_{b3}$ is employed as a point corresponding to point $n_a$. Alternatively, in FIG. 7, a point having a smallest evaluation value and one or more points adjacent to the point having the smallest evaluation value are selected from points $n_{b1}$ to $n_{b6}$ (denoted by solid circles in FIG. 7, and a point having a truly smallest value may be determined from the above points by means of interpolation, and the resultant point may be employed as the corresponding point.

In the example shown in FIGS. 6A and 6B, as described above, points on the line L in the three-dimensional space are selected such that the distance between two directly adjacent points becomes equal to a predetermined value for any combination of two directly adjacent points, and those points are projected onto the image surface $S_2$ of the detection camera 22R. This can be performed as calibration of the reference camera 22L and the detection camera 22R. If the calibration is performed for each of epipolar lines corresponding to respective pixels of the image surface $S_1$ of the reference camera 22L, and the correspondence between points set on the epipolar lines (hereinafter, such points will be referred to as set points) and the distances from the reference cameral 22L to set points is described in a set point distance table, as shown in FIG. 8A, then the distance from the reference cameral 22L (to a user) can be directly determined by detecting a corresponding point from set points and reading the distance described in the set point-distance table. That is, the distance can be determined directly from the corresponding point.

On the other hand, if a point corresponding to point $n_a$ on the reference camera image is detected as point $n_b$ on the detection camera image, the parallax (parallax information) between two points $n_a$ and $n_b$ can be determined. Furthermore, if the relative positions of the reference camera 22L and the detection camera 22R are known, the distance to a user can be determined from the parallax between two points $n_a$ and $n_b$ by means of triangulation. The determination of the distance from the parallax can be performed by calculation based on a known method. If the correspondence between the parallax $\zeta$ and the distance is calculated and described in a parallax-distance table as shown in FIG. 8B, then it is possible to immediately determine the distance from the reference camera 22L by detecting a corresponding point and parallax and reading the parallax distance table.

Because the parallax and the distance to the user correspond in a one-to-one fashion, determining the parallax is equivalent to determining the distance to the user.

The reason why blocks, such as the reference block and the detection block, including a plurality of pixels are used in detecting a corresponding point is to reduce the influence of noise and clearly detect the correlation between the feature of a pixel pattern in the vicinity of a pixel (point) $n_a$ on the reference camera image and the feature of a pixel pattern in the vicinity of a corresponding point (pixel) $n_b$ on the detection camera image thereby detecting the corresponding point in a reliable fashion. In particular, in a case in which the reference camera image and the detection camera image have small changes, the reliability of detection of the corresponding point based on the correlation between images can be increased by increasing the block size.

As for the evaluation function for evaluating the correlation between the reference block and the detection block in the area base matching, the sum of squares or absolute values of differences in pixel value between pixels in the reference block and corresponding pixels in the detection block, or the normalized crosscorrelation can be employed.

The stereoscopic processing has been briefly described above. Further information about the stereoscopic processing can be found, for example, in "Introduction to Image Processing With C" (Yasuin and Nagao, Shokodo Co. Ltd., p. 127)

Figure 9:
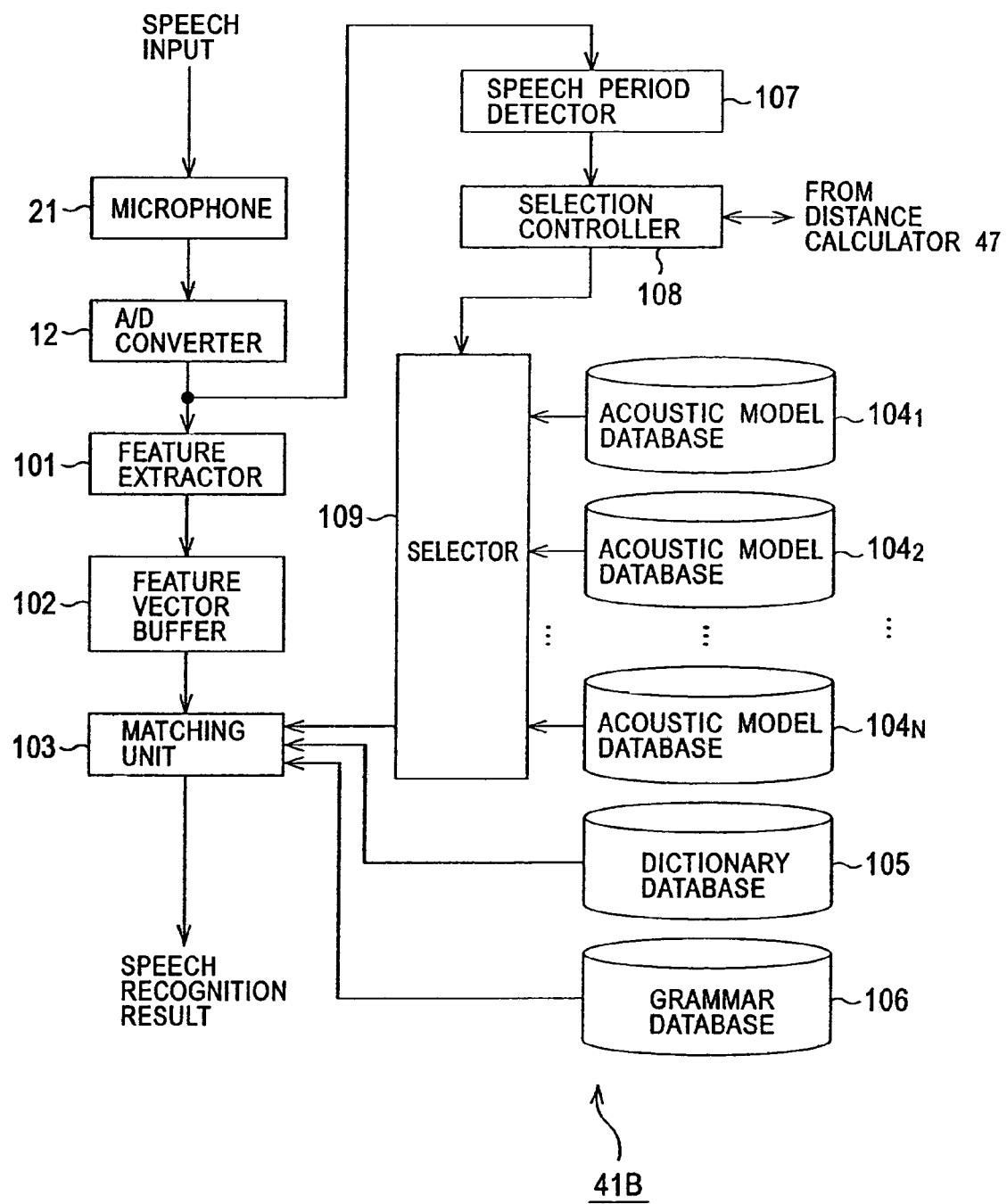
FIG. 9 is a block diagram showing an example of a construction of a speech recognition unit 41B.

FIG. 9 shows an example of a construction of the speech recognition unit 41B shown in FIG. 3.

If the speech recognition unit 41B receives speech data from the microphone 21 via the analog-to-digital converter 12 shown in FIG. 2, the input speech data is applied to a feature extractor unit 101 and a speech period detector 107.

The feature extractor 101 performs acoustic analysis on the speech data supplied from the analog-to-digital converter 12 on a frame-by-frame basis to extract feature vectors as feature values such as MFCC (Mel-Frequency Cepstrum Coefficients). The feature vector extracted by the feature extractor 101 is not limited to MFCC, but other types of feature vectors (feature parameters) such as spectra, linear prediction coefficients, cepstrum coefficients, or line spectra may also be extracted.

The feature vectors extracted frame by frame by the feature extractor 101 are sequentially supplied to the feature vector buffer 102 and stored therein. Thus, the feature vectors extracted frame by frame are time sequentially stored in the feature vector buffer 102.

More specifically, for example, time sequence of feature vectors in a period (speech period) from the start of utterance to the end thereof is stored in the feature vector buffer 102.

The matching unit 103 analyzes the feature vectors stored in the feature vector buffer 102 by examining, as required, an acoustic model database $104_n$ (n=1, 2, . . . , N (N is an integer equal to or greater than 2)), a dictionary database 105, and a grammar database 106, thereby recognizing the speech input to the microphone 21 (input speech) using the continuous distribution HMM method or the like.

The acoustic model database $104_n$ stores an acoustic model representing acoustic characteristics of respective PLUs (Phonetic-Linguistic-Units) such as phonemes or syllables of the language of speeches to be recognized. When the speech recognition is performed using the continuous-distribution HMM algorithm, an HMM (Hidden Markov Model) using a probability density function such as a Gaussian distribution function is used as the acoustic model. The dictionary database 105 stores a word dictionary describing information (phonetic information) about pronunciations of the respective words (vocabulary) to be recognized. The grammar database 106 stores a grammar (language model) describing how the respective words stored in the dictionary database 105 can be concatenated (connected) with each other. As for the grammar, a context free grammar (CFG), a regular grammar (RG), a grammar based on a statistical word concatenation probability model (N-gram or the like may be employed.

The matching unit 103 creates acoustic models of words (word model) by applying the acoustic models stored in the acoustic model database $104_n$ to the words described in the word dictionary stored in the dictionary database 105. Furthermore, the matching unit 103 concatenates some word models with each other on the basis of the grammar stored in the grammar database 106 and recognizes the speech input via the microphone 21 using the concatenated word models, in accordance with the continuous distribution HMM algorithm. More specifically, the matching unit 103 calculates the scores indicating the likelihood that the time sequence of feature vectors stored in the feature vector buffer 102 is observed in the sequence of word models created in the above-described manner. The matching unit 103 then detects a sequence of word models having a highest score, and employs the sequence of words corresponding to the detected sequence of word models as the result of speech recognition.

In the speech recognition based on the HMM method, the matching unit 103 calculates the sum of occurrence probabilities of the feature vectors of the sequence or words corresponding to the concatenated word models, and employs the sum as the score.

That is, the matching unit 103 determines the score by totally evaluating the acoustic score given on the basis of the acoustic model stored in the acoustic model database 104 (hereinafter referred to simply as an acoustic score) and the language score calculated on the basis of the grammar stored in the grammar database 106 (hereinafter referred to simply as a language score).

More specifically, in the case in which the HMM method is used, the acoustic score is calculated for each word on the basis of the probability (occurrence probability) that the sequence of feature vectors output from the feature extractor 101 is observed in the acoustic models forming the word model. On the other hand, in the case where the bigram is used, the language score is determined on the basis of the probability of connection between a word of interest and an immediately preceding word. The overall score is then determined by totally evaluating the acoustic scores and the language scores of the respective words (hereinafter, an overall score determined in such a manner will be referred to simply as an overall score), and the speech recognition result is finally determined on the basis of the overall score.

The speech recognition unit 41B does not necessarily need the grammar database 106. However, it is more desirable that the speech recognition unit 41B includes the grammar database 106, because word models which can be concatenated are restricted by the grammatical rules described in the grammar database 106, and thus it is possible to reduce the number of words to be dealt with by the matching unit 103 in the calculation of acoustic scores. This results in a reduction in the amount of calculation performed by the matching unit 103, and thus the calculation can be performed in a shorter time.

In the example shown in FIG. 9, the voce recognition unit 41B includes N acoustic model databases $104_1, 104_2, \ldots, 104_n$, wherein acoustic models of speeches uttered by a sound source are produced while varying the distance between the microphone and the sound source, and a set of acoustic models obtained for a particular distance is described in one database, and another set of acoustic models for a different distance is described in another database, and so on.

More specifically, for example, the distance from the microphone to the sound source, that is, the speaker of speeches to be learned, is selected to be $D_1, D_2, \ldots, D_n$ (wherein $D_1 < D_2 < \ldots < D_n$) and speeches uttered by the speaker are collected via the microphone for the respective distances $D_1, D_2, \ldots, D_n$. Acoustic models (HMMs, in the present example) obtained for the respective distances $D_1, D_2, \ldots, D_n$ by learning the speech data acquired via the microphone are described in respective acoustic model databases $104_1, 104_2, \ldots, 104_n$.

Thus, an acoustic model database $104_n$ includes a set of acoustic models produced for speeches uttered by the speaker at a particular distance $D_n$ from the microphone.

Of distances $D_1$ to $D_n$, the smallest distance $D_1$ can be selected to be, for example, 0 (in practice, the microphone is placed very close to the mouth of the speaker), and the greatest distance $D_n$ can be selected to be equal to the statistically estimated greatest distance at which users may utter a speech to the robot (for example, maximum possible distances at which users may utter to robots are estimated for many users by means of, for example, questionnaires, and the mean value is employed). The remaining distances $D_2, D_3, \ldots, D_{N-1}$ may be selected, for example, by equally segmenting the distance $D_n$.

A set of acoustic models for a distance $D_n$, described in an acoustic model database $104_n$, may be produced from speeches actually uttered at the distance $D_n$ from the microphone, or may be produced by convoluting an impulse response for a location apart from the microphone by distance $D_n$ with speech data uttered at a location close (as close as substantially zero) to the microphone (such speech data may be acquired, for example, by using a headset microphone). A specific technique of acquiring speech data uttered at allocation apart from the microphone by a particular distance by means of impulse response can be found, for example, reference 2 cited earlier.

The speech period detector 107 detects a speech period on the basis of the output of the analog-to-digital converter 12 and transmits a message indicating the detection result to a selection controller 108. The speech period may be detected, for example, by calculating the power of the output of the analog-to-digital converter 12 for each frame, and determining whether the calculated power is greater than a predetermined threshold value.

If the selection controller 108 receives, from the speech period detector 107, a message indicating that a speech period is detected, the selection controller 108 requests the distance calculator 47 (FIG. 3) to calculate the distance between the microphone 21 to the user. In response to the request, the distance calculator 47 calculates the distance and transmits the calculated distance to the selection controller 108. On the basis of the distance received from the distance calculator 47, the selection controller 108 controls a selector 109.

In the example shown in FIG. 3, the distance calculator 47 calculates the distance from the CCD camera 22L or 22R to the user uttering a speech, by means of stereoscopic processing. Herein, it is assumed that the microphone 21 is located close to the CCD camera 22L or 22R, and thus the distance from the CCD camera 22L or 22R to the user uttering can be regarded as equal to the distance from the microphone 21 to the user uttering. If the relative positions among the CCD cameras 22L and 22R and the microphone 21 are known, the accurate distance from the microphone 21 to the user may be determined from the distance from the CCD camera 22L or 22R to the user.

Under the control of the selection controller 108, the selector 109 selects an acoustic database $104_n$ from N acoustic model databases $104_1$ to $104_n$. Furthermore, the selector 109 acquires the set of acoustic models for the distance $D_n$ stored in the selected acoustic model database $104_n$ and supplies the acquired set of acoustic models to the matching unit 103. On the basis of the acoustic models for the distance $D_n$ supplied from the selector 109, the matching unit 103 calculates the acoustic scores.

Figure 10:
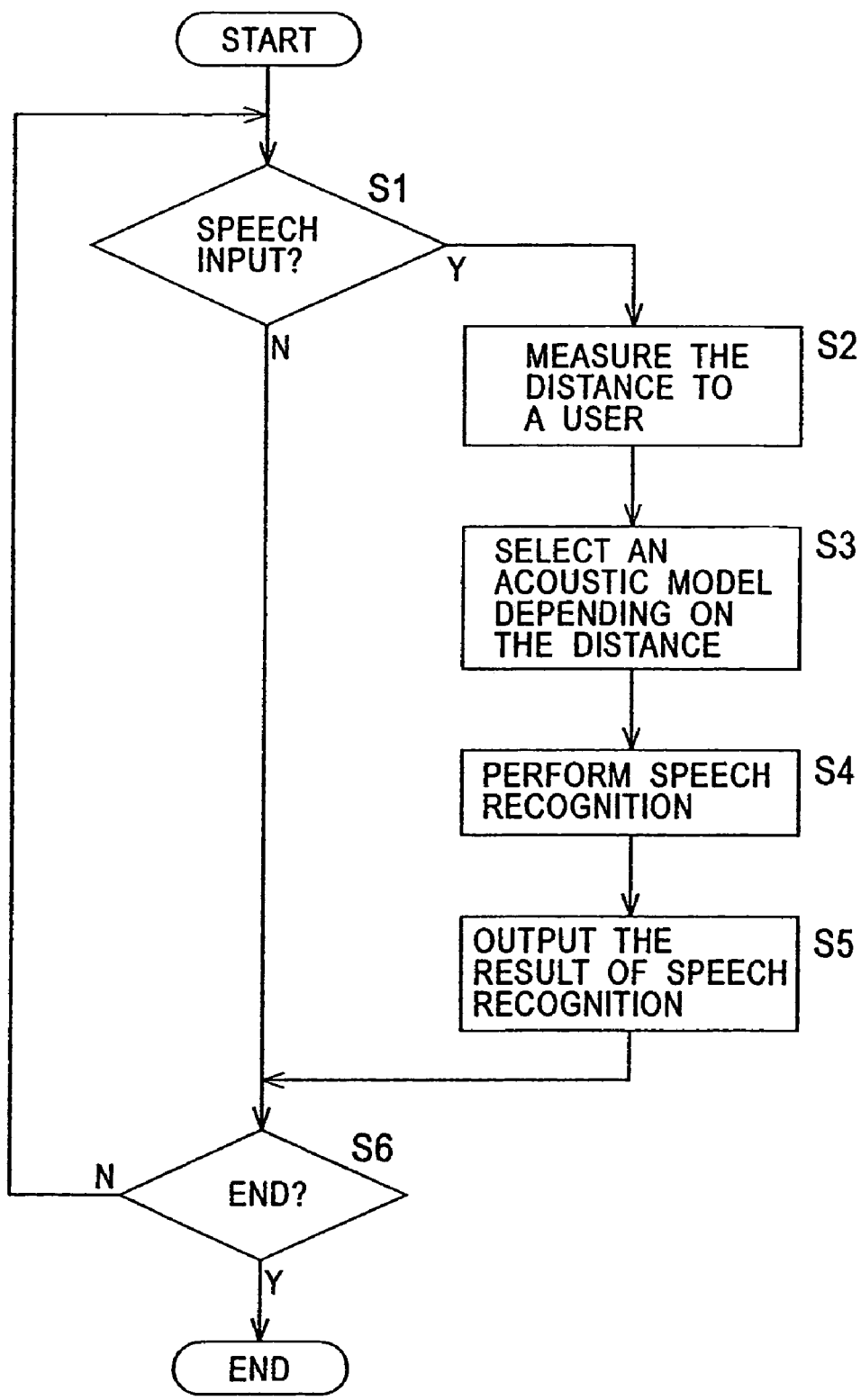
FIG. 10 is a flow chart showing a process associated with the speech recognition unit 41B.

Referring to a flow chart shown in FIG. 10, the speech recognition process performed by the speech recognition unit 41B shown in FIG. 9 is described.

In first step S1, the speech period detector 107 determines whether a speech uttered by a user is received. That is, the speech period detector 107 determines whether a speech period is detected. If a speech period is detected, the speech period detector 107 determines that a speech uttered by the user is received. On the other hand, if a speech period is not detected, the speech period detector 107 determines that no speech is uttered by the user.

If it is determined in step S1 that no speech is input, the process jumps to step S6 without performing steps S2 to S5.

However, if it is determined in step S1 that a speech is input, that is, if the speech period detector 107 detects a speech period, the selection controller 108 receives a message indicating that a speech period has been detected, the feature extractor 101 starts extraction of feature vectors of speech data in the speech period, and the feature vector buffer 102 starts storing the feature vectors, then the process proceeds to step S2. In step S2, the selection controller 108 requests the distance calculator 47 (FIG. 3) to calculate the distance to the user uttering. In response to the request, in step S2, the distance calculator 47 calculates the distance to the user uttering and supplies the calculated distance to the selection controller 108.

In general, the user most likely utters from a direction perpendicular to the face of robot. Thus, it is assumed herein that the CCD cameras 22L and 22R taking images of the user used in calculation of the distance to the user are located in the head unit 3 (FIG. 2) so that the images are taken in the direction perpendicular to the face of the robot.

In this case, if the user uttering is at a location off the direction perpendicular to the face of the robot, such as a location at a side or rear of the robot, the CCD cameras 22L and 22R cannot capture the image of the user. To avoid the above problem, a microphone having directivity in the same direction as the direction in which the CCD cameras 22L and 22R take images may be employed as the microphone 21, and the head unit 3 may be moved until the speech level detected by the microphone 21 becomes greatest thereby making it possible for the CCD cameras 22L and 22R to capture the images of the user.

Alternatively, the robot may include a plurality of microphones, and the direction of the sound source may be estimated from the power difference or phase difference among the speech signals detected by the plurality of microphones. In this case, if the head unit 3 is moved until the head unit 3 faces in the same direction as the detected direction of the sound source, it becomes possible for the CCD cameras 22L and 22R to capture the image of the user. In the case in which a plurality of microphone are disposed on the robot, the speech recognition is performed on the speech data output from a microphone having a greatest speech level (in the case in which the robot moves until the robot faces in the direction of the user, a microphone disposed in the same direction perpendicular to the face of the robot is employed).

In the distance calculator 47 shown in FIG. 3, in order to calculate the distance to the user by means of stereoscopic processing using the images taken by the CCD cameras 22L and 22R, it is needed to detect pixels forming an image of the user from the images taken by the CCD cameras 22L and 22R (hereinafter, such pixels will be referred to as user pixels). This can be performed, for example, by detecting pixels having a particular color such as a skin color as user pixels. Alternatively, the image of the face of the user may be taken by the CCD camera 22L or 22R in advance, and the obtained image of the face may be used as a reference pattern in image recognition to detect user pixels.

If the selection controller 108 receives the data indicating the distance to the user from the distance calculator 47 (FIG. 3), the process proceeds to step S3. In step S3, a distance $D_n$ closest to the distance to the user is selected from N distances $D_1$ to $D_n$ described above, and an acoustic model database $104_n$ in which a set of acoustic models for that distance is stored is selected via the selector 109. That is, in step S3, under the control of the selection controller 108, the selector 109 selects the acoustic model database $104_n$, acquires the set of acoustic models for the distance $D_n$ closest to the distance to the user, and supplies the acquired set of acoustic models to the matching unit 103. Thereafter, process proceeds to step S4.

In step S4, the matching unit 103 reads, from the feature vector buffer 102, the feature vectors extracted from the speech data in the speech period and calculates language scores and the acoustic scores for candidate sequences of words (or words) by using the set of acoustic models for the distance D, supplied from the selector 109, the work dictionary stored in the dictionary database 105, and the grammatical rules stored in the grammar database 106. Furthermore, the overall scores are calculated, a sequence of words (or word) having a highest overall score is employed as a speech recognition result.

Thereafter, the process proceeds to step S5, in which the matching unit 103 outputs the speech recognition result determined in step S4. Thereafter, the process proceeds to step S6.

In step S6, it is determined whether the speech recognition process should be ended. If it is determined that the speech recognition process should be ended, the processing flow returns to step S1 to repeat the process described above.

If it is determined in step S6 that the speech recognition process should be ended, as is the case when the power of the robot is turned off by the user, the speech recognition process is ended.

In the present embodiment, as described above, the distance to the user uttering is calculated, and speech recognition is performed using a set of acoustic models (a set of acoustic models for distance $D_n$) produced from speech data uttered at a distance $D_n$ closest to the calculated distance. Thus, high precision speech recognition can be achieved even for a speech uttered by a user at a location distant from the microphone.

That is, because speech recognition is performed on the basis of a set of acoustic models produced by learning speech data acquired in an acoustic environment similar to that in which a user actually utters, the accuracy of the speech recognition is improved.

In this technique, one set of acoustic models is selected from of N sets of acoustic models, and speech recognition is performed using the selected one set of acoustic models. Thus, the improvement in accuracy of speech recognition can be achieved without causing a (significant) increase in the amount of calculation.

The acoustic environment varies not only depending on the distance between the microphone 21 to the user, but also depending on other factors such as a noise level or reverberation characteristic. By using a set of acoustic models in which such factors are also taken into account, the accuracy in speech recognition can be further improved.

Although in the embodiment shown in FIG. 9, a set of acoustic models optimum for the distance to the user (a set of acoustic models based on a distance closest to the distance to the user) is selected from acoustic model databases $104_1$ to $104_n$ in which sets of acoustic models for respective distances $D_1$ to $D_n$, a set of acoustic models optimum for the distance to the user may be acquired, for example, via a network.

Figure 11:
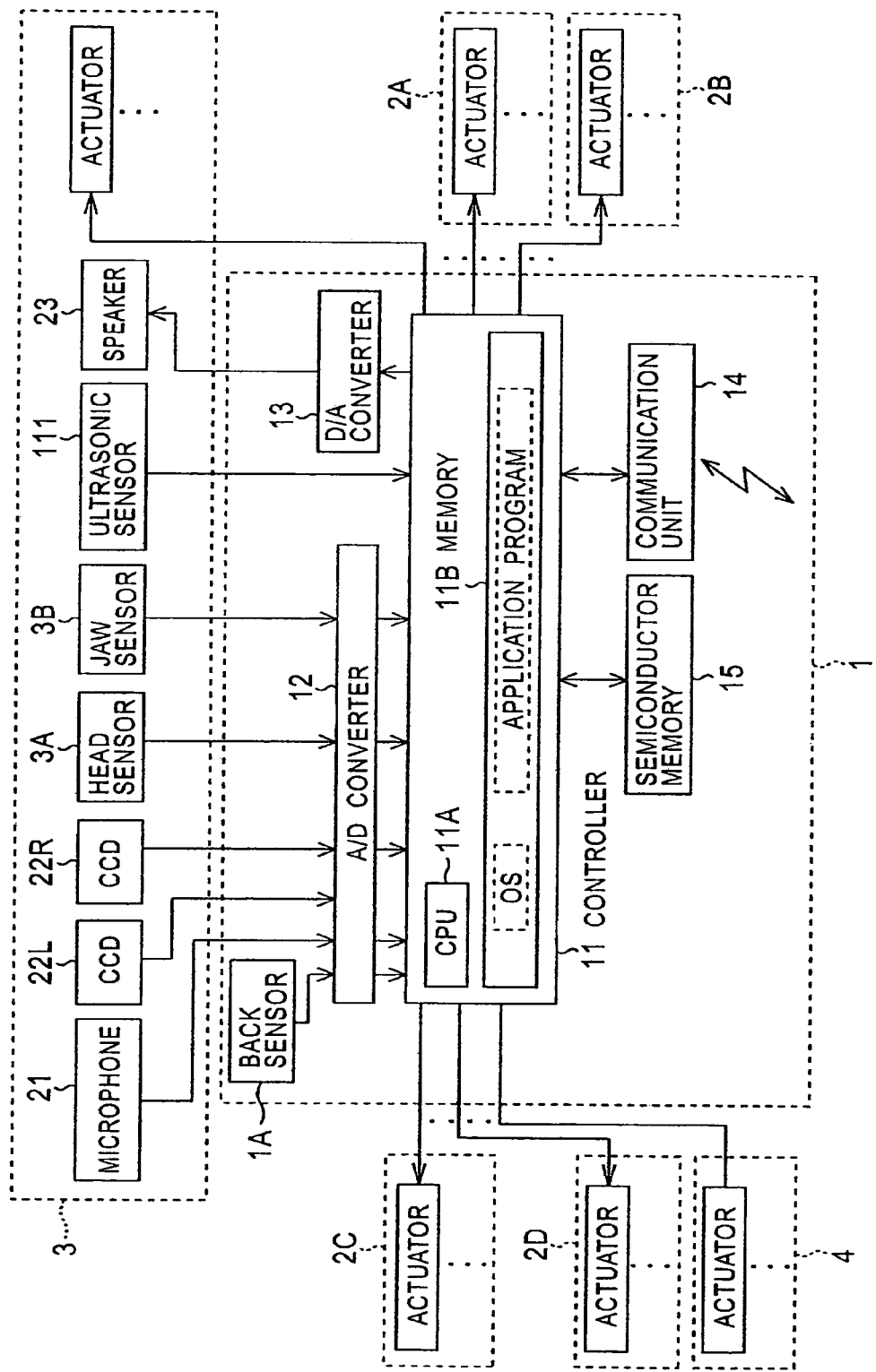
FIG. 11 is a block diagram illustrating another example of the hardware configuration of the pet robot.

FIG. 11 is a block diagram showing another example of an external structure of the pet robot shown in FIG. 1. In FIG. 11, similar parts to those in FIG. 2 are denoted by similar reference numerals, and a further description thereof is not given herein. The pet robot shown in FIG. 11 is similar to that shown in FIG. 2 except that an ultrasonic sensor 111 is additionally disposed in the head unit 3.

Figure 12:
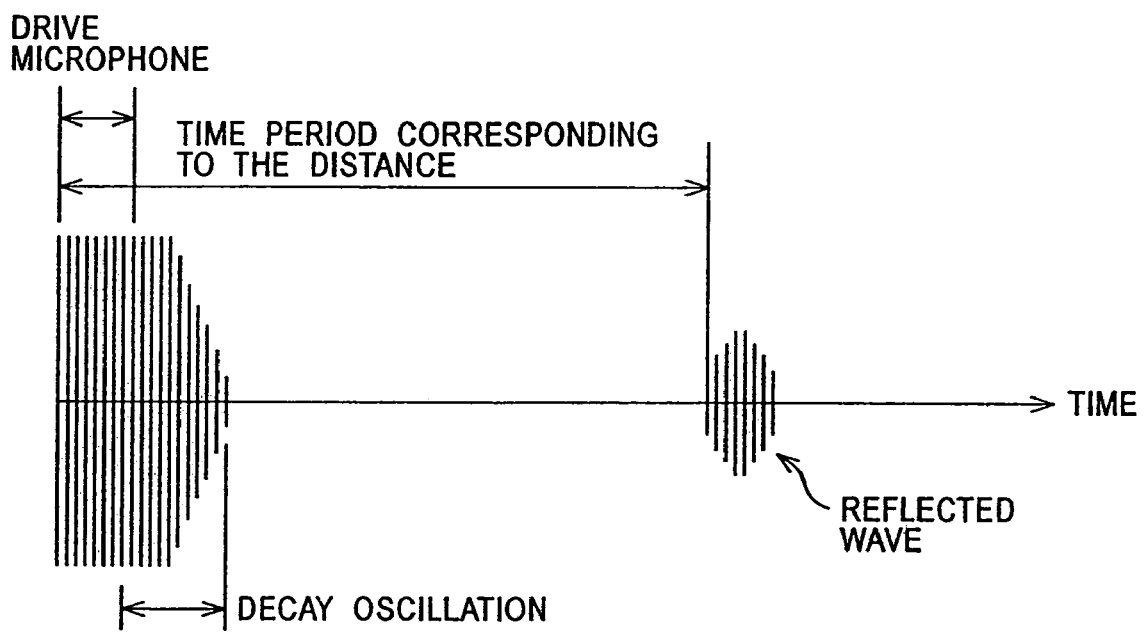
FIG. 12 is a diagram showing a process associated with an ultrasonic sensor 111.

Although not shown in FIG. 11, the ultrasonic sensor 111 includes a sound source and a microphone. As shown in FIG. 12, an ultrasonic pulse is emitted from the sound source. If the ultrasonic pulse is reflected from an obstacle, the reflected wave is received by the microphone of the ultrasonic sensor 111, and the elapsed time since the emission of the ultrasonic pulse to the reception of the reflected wave (hereinafter, such a time will be referred to as a lag time) is determined and supplied to the controller 11.

Figure 13:
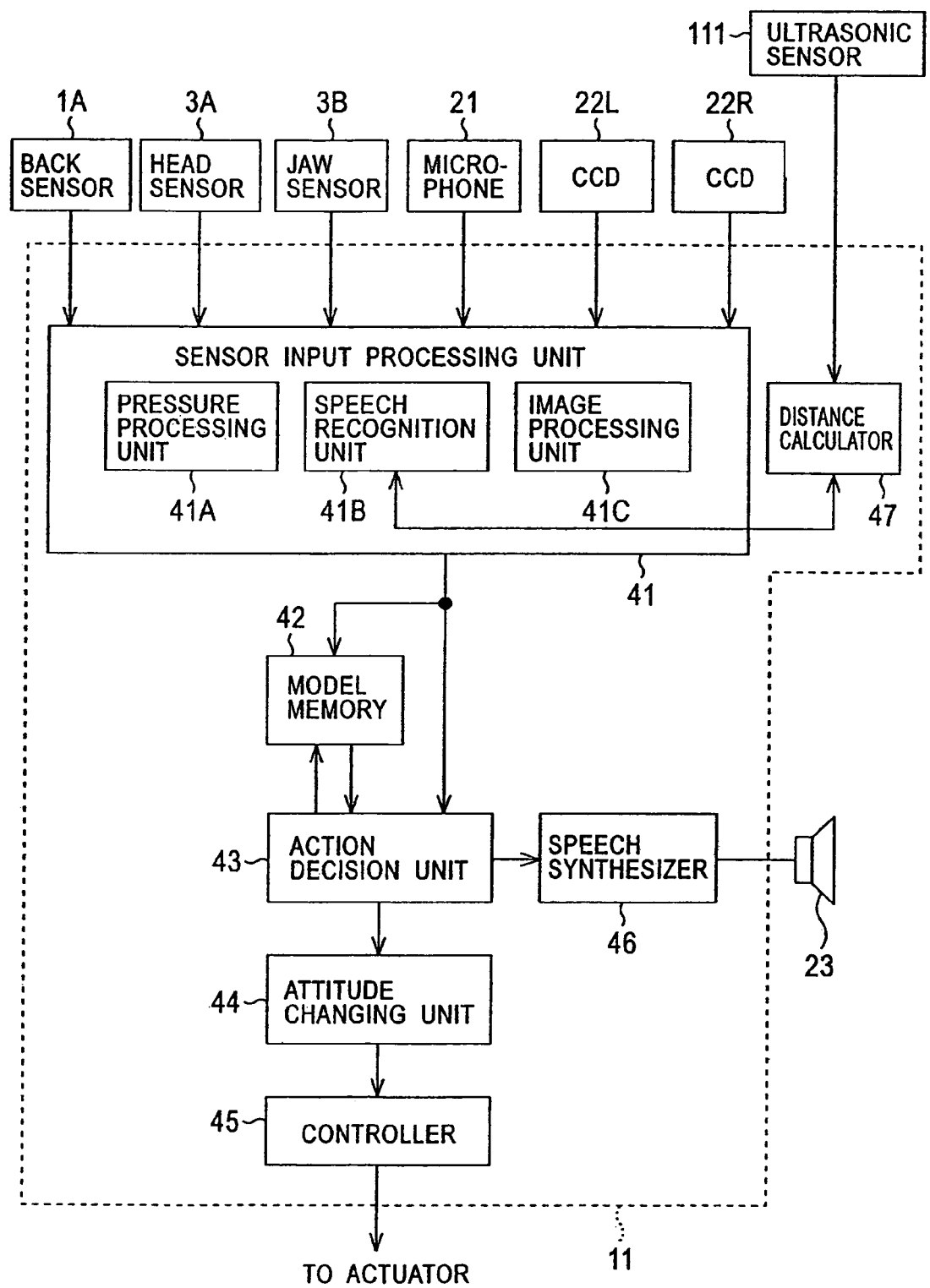
FIG. 13 is a block diagram showing an example of a functional structure of a controller 11.

FIG. 13 shows an example of the functional structure of the controller 11 shown in FIG. 11. In FIG. 13, similar parts to those in FIG. 3 are denoted by similar reference numerals, and they are not described in further detail herein. The controller 11 shown in FIG. 13 is similar to that shown in FIG. 3 except that, instead of the outputs of the CCD cameras 22L and 22R, the output of the ultrasonic sensor 111 is supplied to the distance calculator 47.

In the embodiment shown in FIG. 13, the distance calculator 47 calculates the distance to a user on the basis of the output of the ultrasonic sensor 111.

In the embodiment shown in FIG. 13, the direction of a user uttering is detected using one of above-described techniques including detection based on the directivity of the microphone 21, detection using a plurality of microphones, and detection using image recognition, and the head unit 3 is moved so that the sound source of the ultrasonic sensor 111 is oriented to the user. The ultrasonic sensor 111 emits an ultrasonic pulse toward the user. If a reflected wave is received, the ultrasonic sensor 111 determines the lag time and supplies data indicating the lag time to the distance calculator 47. On the basis of the lag time informed by the ultrasonic sensor 111, the distance calculator 47 calculates the distance to the user and supplies data indicating the calculated distance to the speech recognition unit 41B. Thereafter, the speech recognition 41B performs speech recognition in a similar manner as described above with reference to FIGS. 9 and 10.

Figure 14:
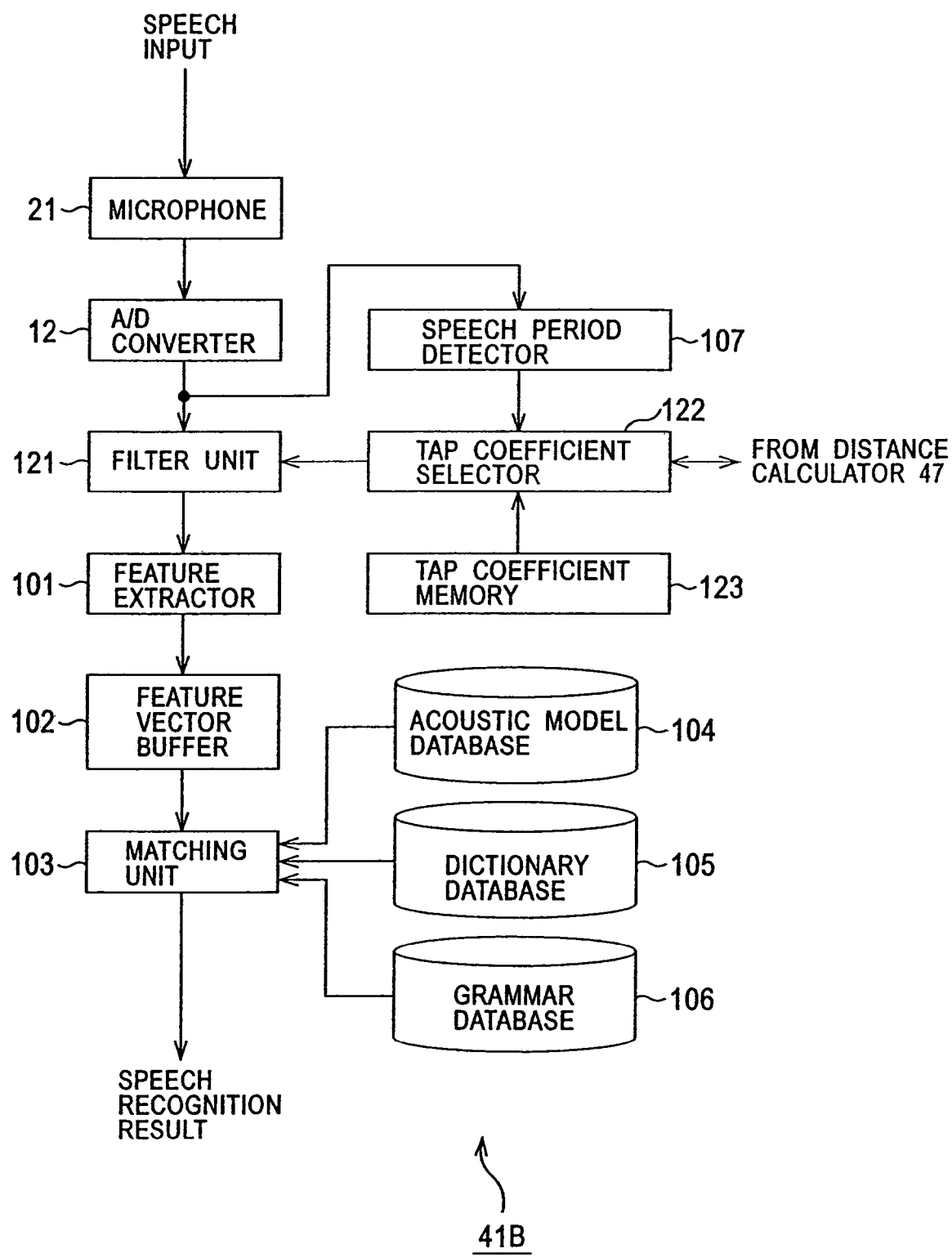
FIG. 14 is a block diagram showing another example of the construction of a speech recognition unit 41.

FIG. 14 shows an another example of the construction of the speech recognition unit 41B shown in FIG. 3 or 13. In FIG. 14, similar parts to those in FIG. 9 are denoted by similar reference numerals, and they are not described in further detail herein.

In the embodiment shown in FIG. 9, a set of acoustic models for a distance closest to the distance to the user is selected from the sets of acoustic models for respective distances $D_1$ to $D_n$, and speech recognition is performed using the selected set of acoustic models. However, in the embodiment shown in FIG. 14, speech data output from the microphone 21 is filtered using an inverse filter having a frequency characteristic corresponding to the distance to a user, and speech recognition is performed on the basis of the resultant filtered speech data, using a set of particular acoustic models.

In the embodiment shown in FIG. 14, an acoustic model database 104 stores a set of acoustic models produced, for example, from speech data uttered at allocation close (as close as substantially zero) to a microphone.

A filter 121 is a digital filter with tap coefficients determined by a tap coefficient selector 122 (hereinafter, such tap coefficients will be referred simply as selected tap coefficients). The filter 121 filters speech data output from the analog-to-digital converter 12, and supplies the resultant filtered speech data to the feature extractor 101.

If the tap coefficient selector 122 receives from the speech period detector 107 a message indicating that a speech period has been detected, the tap coefficient selector 122 requests the distance calculator 47 shown in FIG. 3 or 13 to calculate the distance to the user. In response to the request, the distance calculator 47 calculates the distance and transmits data indicating the calculated distance to the user to the tap coefficient selector 122. The tap coefficient selector 122 reads, from a tap coefficient memory 123, a set of tap coefficients for realizing an inverse filter having a frequency characteristic corresponding to a distance closest to the distance to the user. The tap coefficients read from the tap coefficient memory 123 are supplied as the selected tap coefficients from the tap coefficient selector 122 to the filter and set as the tap coefficients of the filter 121.

The tap coefficient memory 123 stores sets of tap coefficients for realizing a digital filter serving as an inverse filter having characteristic inverse to the frequency characteristics corresponding to N distances $D_1$ to $D_n$, respectively.

In the speech recognition unit 41B constructed in the above-described manner, if the speech period detector 107 detects a speech period, the tap coefficient selector 122 requests the distance calculator 47 (shown in FIG. 3 or 13) to calculate the distance to the user. In response to the request, the distance calculator 47 calculates the distance and transmits data indicating the calculated distance to the user to the tap coefficient selector 122. The tap coefficient selector 122 reads, from a tap coefficient memory 123, a set of tap coefficients for realizing an inverse filter having a frequency characteristic corresponding to a distance closest to the distance to the user. The tap coefficients read from the tap coefficient memory 123 are supplied as the selected tap coefficients to the filter 121.

The filter 121 employs the selected tap coefficients as the tap coefficients thereof and filters the speech data output from the analog-to-digital converter 12 so as to cancel out the effect of the distance from the microphone 21 to the user on the frequency characteristic of the speech data output from the microphone 21, thereby obtaining speech data equivalent to the speech data uttered at a location close to the microphone 21. The resultant speech data is supplied to the feature extractor 101.

Herein, let x(t) (t is time) be speech data of utterance acquired by a microphone located close to an speaker, y(t) be speech data of the same utterance acquired by a microphone at a location apart from the speaker by a distance $D_n$, $h_n(t)$ be an impulse response of a space from the microphone 21 to the location apart from the microphone 21 by the distance $D_n$, and $X(\omega)$, $Y(\omega)$, and $H_n(\omega)$ be Fourier transforms of x(y), y(t), $h_n(t)$ respectively, where ω is an angular frequency, then the following equation holds:

$$Y(\omega)=X(\omega)H_n(\omega) \qquad (1)$$

From equation (1), the following equation is obtained:

$$X(\omega)=Y(\omega)/H_n(\omega) \qquad (2)$$

$H_n(\omega)$ represents the frequency characteristic of space at distance $D_n$. Thus, equation (2) indicates that if speech data $Y(\omega)$ of the utterance acquired by the microphone 21 at the location apart from the speaker by the distance $D_n$ is filtered by an inverse filter having an inverse characteristic of the frequency characteristic $Hd_n(\omega)$ of space at distance $D_n$, that is, $1/H_n(\omega)$, then speech data $X(\omega)$ of the utterance acquired by the microphone 21 located close to the speaker 1 is equivalently obtained.

In the embodiment shown in FIG. 14, the tap coefficient memory 123 stores tap coefficients for realizing inverse filters having characteristics $1/H_1(\omega)$ to $1/H_n(\omega)$ inverse to frequency characteristic $H_1(\omega)$ to $H_n(\omega)$ corresponding to distances $D_1$ to $D_n$. The tap coefficient selector 122 reads a set of tap coefficients for realizing an inverse filter having an inverse frequency characteristic corresponding to a distance closest to an actual distance of a user from the tap coefficient memory 123 and supplies that set of tap coefficients as the selected tap coefficients to the filter 121.

The filter 121 employs the selected tap coefficients as the tap coefficients of the filter 121 (digital filter) to filter the speech data output from the analog-to-digital converter 12 thereby obtaining speech data equivalent to that acquired by the microphone 21 located close to the speaker. The obtained speech data is supplied to the feature extractor 101.

As a result, when the matching unit 103 performs speech recognition, the speech recognition is performed on the speech data equivalent to that acquired by the microphone 21 located close to the speaker on the basis of a set of acoustic models produced from speech data acquired by the microphone 21 actually located close to the speaker. Thus, as in the embodiment shown in FIG. 9, an improvement in speech recognition accuracy can be achieved without causing an increase in the amount of calculation performed by the matching unit 103.

The inverse characteristic $1/H_n(\omega)$ to the frequency characteristic $H_n(\omega)$ corresponding to distance $D_n$ can be ideally determined by emitting an impulse $\delta(t)$ from a location spaced apart from a microphone by distance $D_n$, observing speech data $s(t)$ obtained by capturing the impulse $\delta(t)$ using that microphone, and applying equation (1) or (2) to the result, or can be practically determined by performing similar measurement using a TSP (Time Stretched Pulse) signal.

Note that it is desirable that the microphone 21 and the microphone used to acquire speech data to be learned should have the same frequency characteristic.

The present invention has been described above with reference to specific embodiments in which the present invention is applied to a robot having an actual physical structure. The present invention can also be applied to a virtual robot displayed on a computer and also to other various apparatuses.

The speech recognition process described above can be performed on a general-purpose computer. In this case, by installing a program for speech recognition onto the general-purpose computer, a speech recognition apparatus is implemented on the general-purpose computer.

In this case, the program may be stored, in advance, on a hard disk or a ROM serving as a storage medium disposed inside the computer.

Alternatively, the program may be stored (recorded) temporarily or permanently on a removable storage medium such as a floppy disk, a CD-ROM (Compact Disc Read Only Memory), an MO (Magnetooptical) disk, a DVD (Digital Versatile Disc), a magnetic disk, or a semiconductor memory. Such a removable recording medium may be provided in the form of so-called package software.

Instead of installing the program from the removable storage medium onto the computer, the program may also be transferred to the computer from a download site via a digital broadcasting satellite by means of radio transmission or via a network such as a LAN (Local Area Network) or the Internet by means of wire communication. In this case, the computer receives the program transmitted in such a manner and installs the received program onto the hard disk disposed in the computer.

In the present invention, the processing steps described in the program to be executed by a computer to perform various kinds of processing are not necessarily required to be executed in time sequence according to the order described in the flow chart. Instead, the processing steps may be performed in parallel or separately (by means of parallel processing or object processing).

The program may be executed either by a single computer or by a plurality of computers in a distributed fashion. The program may be transferred to a computer at a remote location and may be executed thereby.

The present invention may also be applied to speech recognition using an algorithm other than the HMM algorithm.

Although in the embodiments described above, the distance to a user is determined by means of stereoscopic processing or by means of an ultrasonic sensor, the distance may be determined by means of other methods. For example, the distance to a user may be determined by recognizing a speech uttered by the user. The distance may also be determined in such a manner that when a user a presses a distance measurement button disposed on a remote commander, a robot determines the distance to the user.

INDUSTRIAL APPLICABILITY

According to a first speech recognition apparatus, speech recognition method, and program, the distance to a source of a speech is determined and a set of acoustic models corresponding to that distance is acquired. Speech recognition is performed using the acquired set of acoustic models. This allows an improvement in speech recognition accuracy.

According to a second speech recognition apparatus, speech recognition method, and program, the distance to a source of a speech is determined and tap coefficients for realizing an inverse filter having a frequency characteristic corresponding to the distance are acquired. A speech is filtered using the acquired tap coefficients, and the filtered speech is recognized using a particular set of acoustic models. This allows an improvement in speech recognition accuracy.

The invention claimed is:

1. A speech recognition apparatus for recognizing an input speech, comprising:

distance from the microphone calculation means for determining the distance to a sound source of said speech;

storage means for storing plural sets of acoustic models produced from speech uttered by sound sources located at different distances;

acquisition means for selecting tap coefficients for realizing an inverse filter having a frequency characteristic corresponding to the distance determined by the distance calculation means, from the plural sets of acoustic models for various distances stored in the storage means;

filter means for filtering said speech using the tap coefficients acquired by the acquisition means; and speech recognition means for recognizing said speech filtered by the filter means, on the basis of a particular set of acoustic models.

2. A speech recognition method of recognizing an input speech, comprising the steps of:
- determining the distance from the microphone to a sound source of said speech;
- storing plural sets of acoustic models produced from speech uttered by sound sources located at different distances;
- selecting tap coefficients for realizing an inverse filter having a frequency characteristic corresponding to the distance determined in the distance determination step, from the plural sets of acoustic models for various distances stored in the storing step;
- filtering said speech using the tap coefficients selected in the selection step; and
- recognizing said speech filtered in the filtering step, on the basis of a particular set of acoustic models.

3. A program embodied in a computer storage medium for causing a computer to recognize an input speech, said program performing the steps of:
- determining the distance from the microphone to a sound source of said speech;
- storing plural sets of acoustic models produced from speech uttered by sound sources located at different distances;
- selecting tap coefficients for realizing an inverse filter having a frequency characteristic corresponding to the distance determined in the distance determination step, from the plural sets of acoustic models for various distances stored in the storing step;
- filtering said speech using the tap coefficients selected in the selection step; and
- recognizing said speech filtered in the filtering step, on the basis of a particular set of acoustic models.

4. A computer storage medium having a program stored thereon for causing a computer to recognize an input speech, said program comprising the steps of:
- determining the distance from a microphone to a sound source of said speech;
- storing plural sets of acoustic models produced from speech uttered by sound sources located at different distances;
- selecting tap coefficients for realizing an inverse filter having a frequency characteristic corresponding to the distance determined in the distance determination step, from the plural sets of acoustic models for various distances stored in the storing step;
- filtering said speech using the tap coefficients selected in the selections step; and
- recognizing said speech filtered in the filtering step, on the basis of a particular set of acoustic models.

* * * * *